United States Patent
Shearer et al.

(10) Patent No.: US 11,064,645 B2
(45) Date of Patent: Jul. 20, 2021

(54) SYSTEM AND METHOD FOR CONTROLLING OPERATION OF A WORK VEHICLE TOWING AN AGRICULTURAL IMPLEMENT

(71) Applicant: CNH Industrial America LLC, New Holland, PA (US)

(72) Inventors: Scott Shearer, Hilliard, OH (US); Andrew Klopfenstein, West Jefferson, OH (US); Brittany Schroeder, Cloverdale, OH (US)

(73) Assignee: CNH Industrial America LLC, New Holland, PA (US)

( * ) Notice: Subject to any disclaimer, the term of this patent is extended or adjusted under 35 U.S.C. 154(b) by 164 days.

(21) Appl. No.: 16/161,963

(22) Filed: Oct. 16, 2018

(65) Prior Publication Data
US 2020/0113123 A1 Apr. 16, 2020

(51) Int. Cl.
| | |
|---|---|
| *A01B 76/00* | (2006.01) |
| *A01B 67/00* | (2006.01) |
| *B60K 23/00* | (2006.01) |
| *B60K 31/00* | (2006.01) |
| *A01B 79/00* | (2006.01) |
| *B60K 26/00* | (2006.01) |
| *B60K 26/02* | (2006.01) |

(52) U.S. Cl.
CPC ............. *A01B 76/00* (2013.01); *A01B 67/00* (2013.01); *A01B 79/00* (2013.01); *B60K 23/00* (2013.01); *B60K 26/00* (2013.01); *B60K 26/02* (2013.01); *B60K 31/00* (2013.01)

(58) Field of Classification Search
CPC .............................. A01B 76/00; A01B 67/00
See application file for complete search history.

(56) References Cited

U.S. PATENT DOCUMENTS

| | | |
|---|---|---|
| 5,995,895 A | 11/1999 | Watt et al. |
| 6,041,582 A | 3/2000 | Tiede et al. |
| 6,061,618 A | 5/2000 | Hale et al. |
| 6,144,910 A | 11/2000 | Scarlett et al. |
| 6,553,300 B2 | 4/2003 | Ma et al. |

(Continued)

OTHER PUBLICATIONS

Tekin et al., Sensing and 3D Mapping of Soil Compaction, Soil Compaction, May 26, 2008, pages.

*Primary Examiner* — Thomas G Black
*Assistant Examiner* — Tarek Elarabi
(74) *Attorney, Agent, or Firm* — Rebecca L. Henkel; Rickard K. DeMille (57) ABSTRACT

A system for controlling work vehicles used for towing agricultural implements across a field includes an implement controller supported on and configured to control an operation of an agricultural implement, and at least one sensor communicatively coupled to the implement controller. The sensor(s) is configured to provide an indication of a location of the agricultural implement within the field. The implement controller is configured to: access a field map; anticipate a change in loading of one or more of the ground-engaging tools of the implement based on the location of the implement relative to the field map; and transmit a request instructing a vehicle controller of a work vehicle towing the agricultural implement to initiate a control action associated with adjusting at least one vehicle-related operational parameter to accommodate the anticipated change.

17 Claims, 4 Drawing Sheets

(56) References Cited

U.S. PATENT DOCUMENTS

| | | |
|---|---|---|
| 6,665,601 B1 | 12/2003 | Nielsen |
| 7,302,837 B2 | 12/2007 | Wendte |
| 7,721,813 B2 | 5/2010 | Hou |
| 7,954,556 B2 | 6/2011 | Hou et al. |
| 8,700,270 B2 | 4/2014 | Foster et al. |
| 9,511,633 B2 | 12/2016 | Anderson et al. |
| 9,554,499 B2 | 1/2017 | Müller et al. |
| 9,702,115 B1 | 7/2017 | Darukhanavala |
| 2008/0257569 A1 | 10/2008 | Foster et al. |
| 2015/0296701 A1* | 10/2015 | Anderson ............... A01B 79/00 172/2 |
| 2016/0029547 A1 | 2/2016 | Casper et al. |
| 2016/0088787 A1* | 3/2016 | Connell ............... A01B 63/112 701/50 |
| 2016/0334798 A1* | 11/2016 | Foster ................. G05D 1/0274 |
| 2017/0013773 A1 | 1/2017 | Kirk et al. |
| 2018/0024549 A1* | 1/2018 | Hurd ....................... H04W 4/40 701/2 |

\* cited by examiner

SYSTEM AND METHOD FOR CONTROLLING OPERATION OF A WORK VEHICLE TOWING AN AGRICULTURAL IMPLEMENT

FIELD

The present disclosure generally relates to agricultural implements and, more particularly, to systems and methods for controlling operation of a work vehicle towing an agricultural implement.

BACKGROUND

Agricultural implements, such as cultivators or other tillage-related equipment, pull-type sprayers, nutrient applicators, planters, seeders, and/or the like, are configured to be towed across a field by a suitable work vehicle, such as an agricultural tractor. While traversing the field, the implement is configured to perform one or more operations on the field, such as cultivating the soil and/or applying pesticides, nutrients, and/or other agricultural substances. In many instances, to maintain the desired precision of the operation(s) being performed by the implement, it is necessary to adjust one or more operational parameters of the implement while the implement is being towed across the field. In this regard, the implement generally includes one or more hydraulic cylinders and associated hydraulic components (e.g., pressure-regulating valves) that are configured to adjust the operational parameter(s) of the implement, such as the down force or pressure being applied onto one or more ground-engaging tools of the implement.

As demands increase for more highly automated agricultural systems, a need exists for an implement capable of communicating with the work vehicle to complement increased automation of tool position and/or control. Accordingly, the present subject matter is directed to an improved system and method for controlling operation of a work vehicle towing an agricultural implement.

BRIEF DESCRIPTION

Aspects and advantages of the technology will be set forth in part in the following description, or may be obvious from the description, or may be learned through practice of the technology.

In one aspect, the present subject matter is directed to a system for controlling a work vehicle towing an agricultural implement having ground-engaging tools across a field. The system includes a vehicle controller configured to control operation of the work vehicle, an implement controller configured to control operation of the implement, and at least one sensor communicatively coupled to either or both of the vehicle controller and/or the implement controller. The vehicle controller and/or the implement controller are also programmed with a field map. The sensor(s) is configured to provide an indication of a location of the implement within the field. The implement controller is configured to perform one or more operations, including but not limited to anticipating a change in loading of one or more of the ground-engaging tools of the implement based on the location of the implement relative to the field map and transmitting a request instructing the vehicle controller to initiate a control action associated with adjusting at least one operational parameter of the work vehicle to accommodate the anticipated change.

In another aspect, the present subject matter is directed to a method for controlling a work vehicle towing an agricultural implement having ground-engaging tools in a field. The method includes storing at least one field map in a memory of at least one of an implement controller or a vehicle controller. The method also includes receiving, via the implement controller, sensor data from at least one location sensor indicative of a location of the implement within the field. Further, the method includes anticipating, via the implement controller, a change in loading of one or more of the ground-engaging tools of the implement based on the location of the implement relative to the field map. Moreover, the method may include transmitting a request instructing the vehicle controller to initiate a control action associated with adjusting at least one operational parameter of the work vehicle to accommodate the anticipated change.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling a work vehicle towing an agricultural implement in a field. The system includes a vehicle controller for controlling operation of the work vehicle, an implement controller for controlling operation of the implement, and at least one sensor communicatively coupled to either or both of the vehicle controller or the implement controller. In addition, the vehicle controller and/or the implement controller are also programmed with a field map. The sensor(s) is configured to provide an indication of a location of the implement within the field. As such, the implement controller is configured to anticipate a change in loading of the ground-engaging tools of the implement based on the location of the implement relative to the field map and transmit a request instructing the vehicle controller to initiate a control action associated with adjusting an operational parameter of the work vehicle to accommodate the anticipated change. For instance, the implement controller may be configured to transmit the request to the vehicle controller (e.g., via ISOBUS Class 3 communications protocols (ISO 11783-9)) requesting the vehicle controller to adjust the operation of the work vehicle (e.g., by controlling the engine speed and/or gear of the work vehicle). As such, based on the request from the implement controller, the vehicle controller may adjust an operational parameter of the vehicle to maintain the vehicle's operating efficiency and/or to prevent undesirable performance of the implement.

Figure 1:
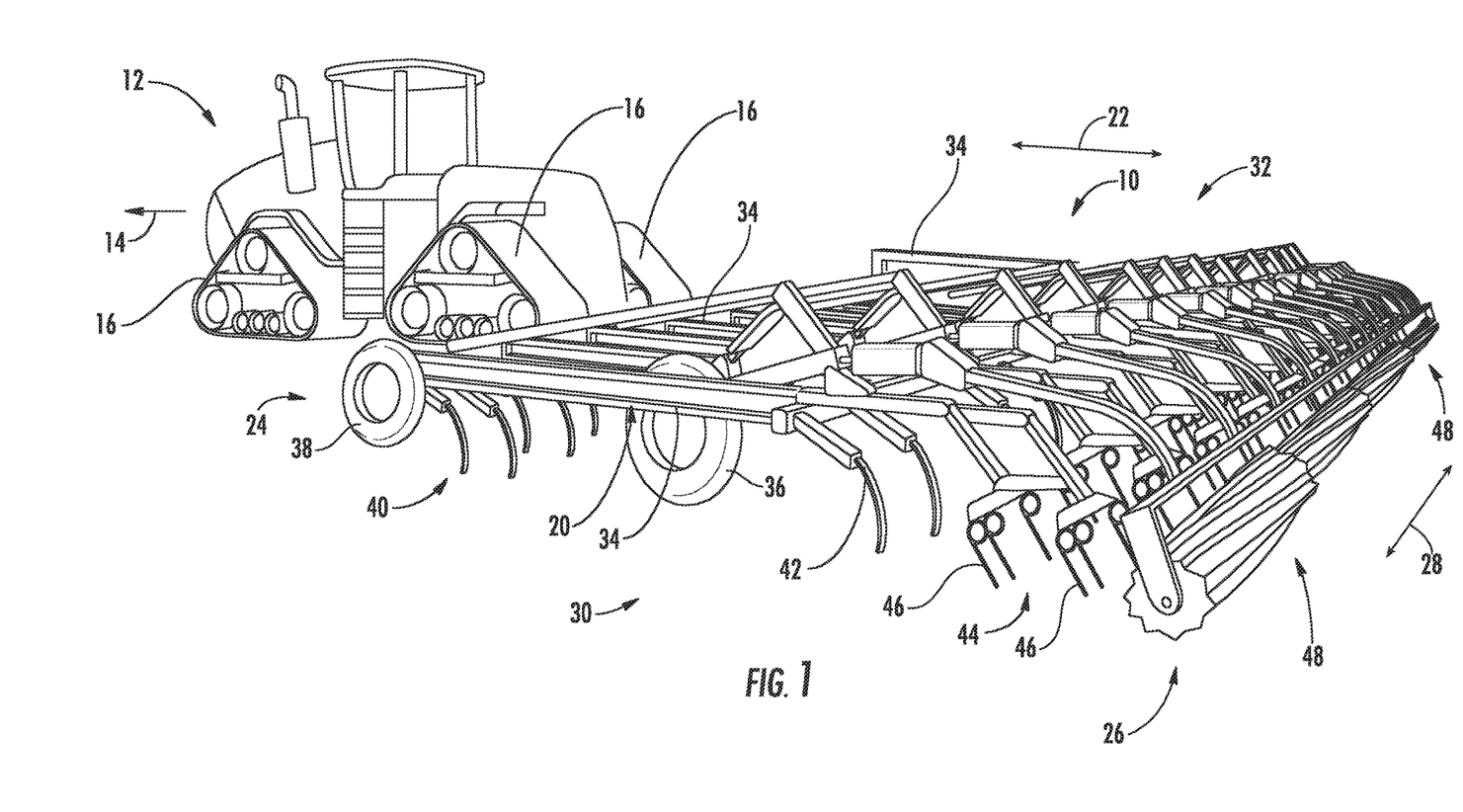
FIG. 1 illustrates a perspective view of one embodiment of an agricultural implement coupled to a work vehicle in accordance with aspects of the present subject matter.

Referring now to the drawings. FIG. 1 illustrates a perspective view of one embodiment of an agricultural implement 10 coupled to a work vehicle 12. In general, the implement 10 may be configured to be towed across a field along a direction of travel 14 by the work vehicle 12. As shown, the work vehicle 12 may be configured as an agricultural tractor having a plurality of track assemblies 16 for use in traversing the field. It should be appreciated, however, that the work vehicle 12 may be configured as any suitable work vehicle, such as a wheeled vehicle. As will be described below, a hitch assembly (not shown) of the work vehicle 12 may be configured to be coupled to the implement 10.

It should be appreciated that the configuration of the implement 10 and the work vehicle 12 described herein is provided only to place the present subject matter in an exemplary field of use. Thus, it should be appreciated that the present subject matter may be readily adaptable to any manner of implement, work vehicle, and/or hitch assembly configurations.

In several embodiments, the implement 10 may include an implement frame 20. As shown, the frame 20 may extend along a longitudinal direction 22 between a forward end 24 and an aft end 26. The frame 20 may also extend along a lateral direction 28 between a first side 30 and a second side 32. In this respect, the frame 16 generally includes a plurality of structural frame members 34, such as beams, bars, and/or the like, configured to support or couple to a plurality of components. Additionally, a plurality of wheels may be coupled to the frame 20, such as a set of centrally located wheels 36 (one is shown) and a set of front pivoting wheels 38 (one is shown), to facilitate towing the implement 10 in the direction of travel 14.

In one embodiment, the frame 20 may be configured to support a cultivator 40, which may be configured to till or otherwise break the soil over which the implement 10 travels to create a seedbed. In this respect, the cultivator 40 may include a plurality of ground-engaging tools 42 (e.g., shanks), which are pulled through the soil as the implement 10 moves across the field in the direction of travel 14. The ground-engaging tools 42 may be configured to be pivotally mounted to the frame 20 to allow the ground-engaging tools 42 pivot out of the way of rocks or other impediments in the soil.

Moreover, as shown in FIG. 1, the implement 10 may also include one or more harrows 44. As is generally understood, the harrows 44 may be configured to be pivotally coupled to the frame 20. The harrows 44 may include a plurality of ground-engaging tools 46, such as tines or discs, which are configured to level or otherwise condition any ridges in the soil created by the cultivator 40. Specifically, the ground-engaging tools 46 may be configured to be pulled through the soil as the implement 10 moves across the field in the direction of travel 14. It should be appreciated that the implement 10 may include any suitable number of harrows 44. In fact, some embodiments of the implement 10 may not include any harrows 44.

Still referring to FIG. 1, the implement 10 may optionally include one or more additional ground-engaging tools, such as one or more baskets or rotary firming wheels 48. As is generally understood, the baskets 48 may be configured to reduce the number of clods in the soil and/or firm the soil over which the implement 10 travels. As shown, each basket 48 may be configured to be pivotally coupled to one of the harrows 44. Alternately, the baskets 48 may be configured to be pivotally coupled to the frame 20 or any other suitable location of the implement 10. It should be appreciated that the implement 10 may include any suitable number of baskets 48. In fact, some embodiments of the implement 10 may not include any baskets 48.

It should be appreciated that, in addition to the ground-engaging tools described above (or as an alternative thereto), the implement 10 may include any other suitable type and/or combination of ground-engaging tools. For example, in one embodiment, the implement 10 may be configured as a disk ripper and may include one or more sets of ganged discs, either alone or in combination with any other suitable ground-engaging tools (e.g., shanks, basket, etc.).

Figure 2:
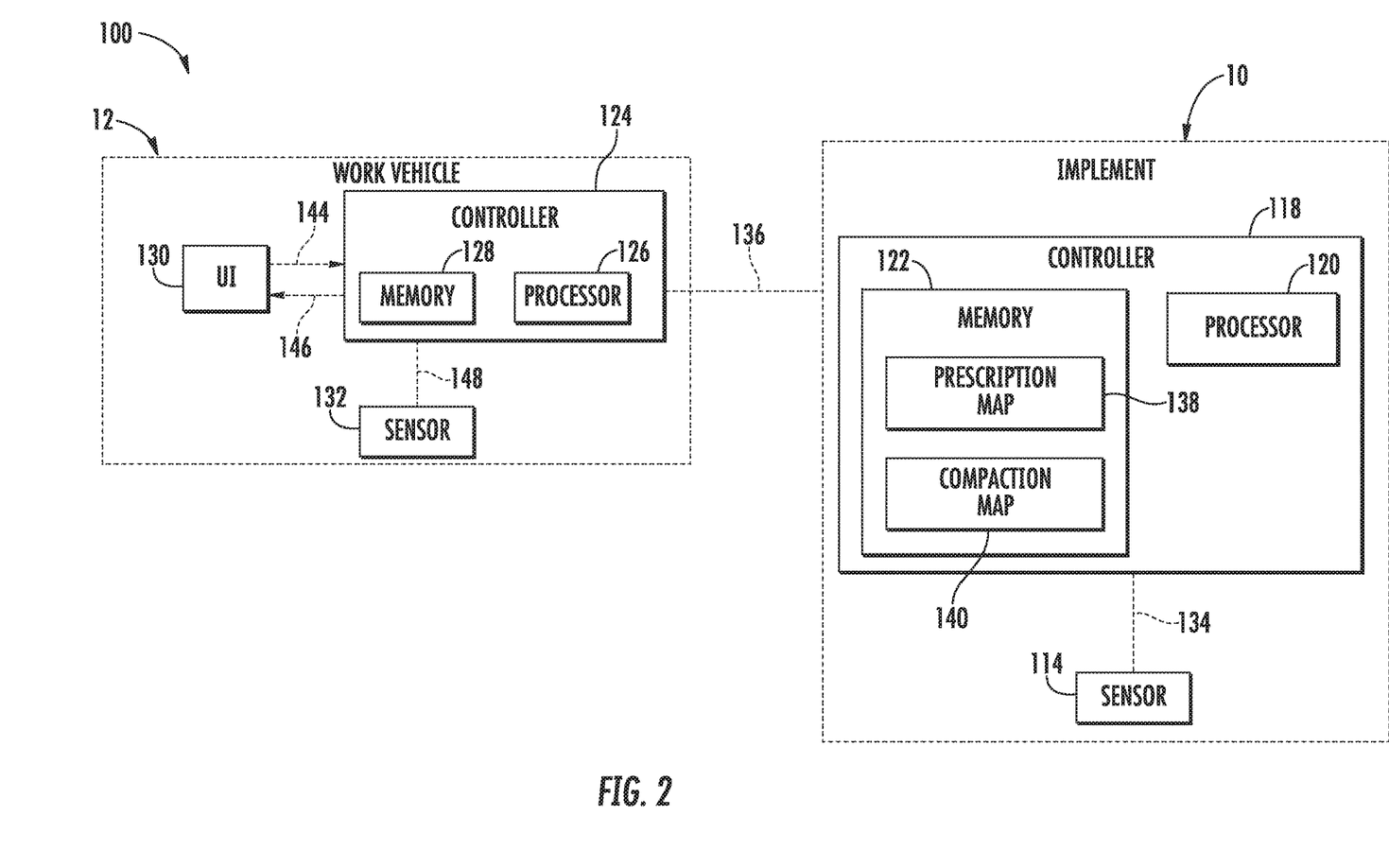
FIG. 2 illustrates a schematic view of one embodiment of a system for controlling the operation of a work vehicle towing an agricultural implement in accordance with aspects of the present subject matter.

Referring now to FIG. 2, a schematic view of one embodiment of a system 100 for controlling operation of a work vehicle towing an agricultural implement is illustrated in accordance with aspects of the present subject matter. In general, the system 100 will be described herein with reference to the implement 10 and the work vehicle 12 described herein. However, it should be appreciated by those of ordinary skill in the art that the disclosed system 100 may generally be utilized with implements having any other suitable implement configuration, work vehicles having any other suitable work vehicle configuration, and/or hitch assemblies having any other suitable hitch assembly configuration.

As shown in FIG. 2, the system 100 may include one or more implement controllers 118 positioned on and/or within or otherwise associated with the implement 10. In general, the implement controller 118 may include any suitable processor-based device known in the art, such as a computing device or any suitable combination of computing devices. Thus, in several embodiments, the implement controller 118 may include one or more processor(s) 120 and associated memory device(s) 122 configured to perform a variety of computer-implemented functions. As used herein, the term "processor" refers not only to integrated circuits referred to in the art as being included in a computer, but also refers to a controller, a microcontroller, a microcomputer, an Electronic Control Unit (ECU), a programmable logic controller (PLC), an application specific integrated circuit, and other programmable circuits. Additionally, the memory device(s) 122 of the implement controller 118 may generally include memory element(s) including, but not limited to, a computer readable medium (e.g., random access memory (RAM)), a hard disk drive (HDD), a solid-state drive (SSD), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 122 may generally be configured to store suitable computer-readable instructions that, when implemented by the processor(s) 120, configure the implement controller 118 to perform various computer-implemented functions, such as one or more aspects of the method 200 described below with reference to FIG. 4. In addition, the implement controller 118 may also include various other suitable components, such as a communications circuit or module, one or more input/output channels, a data/control bus and/or the like.

It should be appreciated that the implement controller 118 may correspond to an existing controller of the implement 10, itself, or the controller 118 may correspond to a separate processing device. For instance, in one embodiment, the implement controller 118 may form all or part of a separate plug-in module that may be installed in association with the implement 10 to allow for the disclosed systems and methods to be implemented without requiring additional software to be uploaded onto existing control devices of the implement 10. It should also be appreciated that the functions of the implement controller 118 may be performed by a single processor-based device or may be distributed across any number of processor-based devices, in which instance such devices may be considered to form part of the implement controller 118.

Moreover, the system 100 may include one or more work vehicle controllers 124 positioned on and/or within or otherwise associated with the work vehicle 12. In general, the vehicle controller 124 may include any suitable processor-based device known in the art, such as a computing device or any suitable combination of computing devices. Thus, in several embodiments, the vehicle controller 124 may include one or more processor(s) 126 and associated memory device(s) 128 configured to perform a variety of computer-implemented functions. Such memory device(s) 128 may generally be configured to store suitable computer-readable instructions that, when implemented by the processor(s) 126, configure the vehicle controller 124 to perform various computer-implemented functions, such as one or more aspects of the method 200 described below with reference to FIG. 4. In addition, the vehicle controller 124 may also include various other suitable components, such as a communications circuit or module, one or more input/output channels, a data/control bus and/or the like.

It should be appreciated that the vehicle controller 124 may correspond to an existing controller of the work vehicle 12, itself, or the vehicle controller 124 may correspond to a separate processing device. For instance, in one embodiment, the vehicle controller 124 may form all or part of a separate plug-in module that may be installed in association with the work vehicle 12 to allow for the disclosed systems and methods to be implemented without requiring additional software to be uploaded onto existing control devices of the work vehicle 12. It should also be appreciated that the functions of the vehicle controller 124 may be performed by a single processor-based device or may be distributed across any number of processor-based devices, in which instance such devices may be considered to form part of the vehicle controller 124. For instance, the functions of the vehicle controller 124 may be distributed across multiple application-specific controllers, such as an electro-hydraulic remote (EHR) valve controller, a navigation controller, and/or the like.

Furthermore, in one embodiment, the system 100 may also include a user interface 130 of the work vehicle 12. In such an embodiment, the vehicle controller 124 may be communicatively coupled to the user interface 130 via a wired or wireless connection to allow user input signals (e.g., indicated by dashed line 144 in FIG. 2) to be transmitted from the user interface 130 to the controller vehicle 124. More specifically, the user interface 130 may be configured to receive various instructions from an operator of the work vehicle 12. As such, the user interface 130 may include one or more input devices (not shown), such as touchscreens, keypads, touchpads, knobs, buttons, sliders, switches, mice, microphones, and/or the like, which are configured to receive user inputs from the operator. In addition, some embodiments of the user interface 130 may include one or more feedback devices (not shown), such as display screens, speakers, warning lights, and/or the like, which are configured to communicate feedback, such as feedback from the controllers 118, 124, to the operator of the work vehicle 12. However, in alternative embodiments, the user interface 130 may have any suitable configuration.

Furthermore, the communicative coupling provided between the vehicle controller 124 and the user interface 130 may also allow feedback signals (e.g., indicated by dashed line 146 in FIG. 2) to be transmitted from the controller 124 to the user interface 130. For example, the vehicle controller 124 may be configured to transmit a notification to the operator (e.g., by causing a visual or audible notification or indicator to be presented to the operator within the work vehicle 12). Thus, upon receipt of the associated feedback signals 146, the user interface 130 may be configured to present the notification to the operator. It should be appreciated that, in alternative embodiments, the user interface 130 may be communicatively coupled directly to the implement controller 118 such that the implement controller 118 transmits the feedback signals 146 to the user interface 130.

Additionally, the system 100 may include one or more vehicle-based sensors 132 configured to detect an operational parameter of the work vehicle 12 (e.g., indicated by dashed lines 148 in FIG. 2). In several embodiments, the operational parameter detected by the sensor(s) 132 may include an engine speed associated with the vehicle's engine, a throttle position (which is the fuel rate in relation to engine speed), and/or a gear selection associated with the vehicle's transmission. For example, in one embodiment, an operator may run the work vehicle 12 at full throttle, and then shift the gears to achieve an acceptable operating condition. In such embodiments, with prescriptive tillage, wheel/ground speed control may be controlled (which is a combination of engine speed and transmission gear ratio). In addition, it should be appreciated that the sensor(s) 132 may correspond to any other suitable type of sensor and/or the sensor(s) 132 may be configured to detect any other suitable parameter of the work vehicle 12.

Similarly, in several embodiments, the implement controller 118 may be configured to monitor an operational parameter(s) associated with the operation of the implement 10 based on sensor data received from one or more sensors 114 mounted to the work vehicle 12 and/or the implement 10. Specifically, the implement controller 118 may be communicatively coupled to the sensor(s) 114 via a wired or wireless connection to allow sensor data (e.g., indicated by dashed lines 134 in FIG. 2) to be transmitted from the sensor 114 to the implement controller 118. The sensor(s) 114 may be configured to monitor a location of the implement in the field and/or determine or estimate various operational parameters of the implement 10. For example, in another embodiment, the sensor(s) 114 may be configured to monitor a load acting on the implement 10 within the field. In such embodiments, the sensor(s) 114 would allow for continually recalibrating of the draft load model for the implement 10. For example, in one embodiment, a draft load model for the implement 10 may be determined using Equation (1) below:

$$D=F_i[(A_{DG}+BDGS)WTDG+(A_S+CSS^2)N_S(T_S-T_{DG})+(A_{LD}+B_{LD}S)W+A_{RB}W]$$  Equation (1)

Where
D is the draft force;
$F_i$ is the soil parameter coefficient, which changes based on soil properties and/or characteristics:
W is the working width of the implement 10;
S is the engine speed of the work vehicle 12;
ADG and BDG are the coefficients for the disk gangs:
TDG is the disk gang depth;
AS and CS are the coefficients for shank draft;
TS is the shank depth:
NS is the number of shanks;
ALD, BLD are the coefficients for leveling disk draft; and
ARB is the coefficient for the rolling basket.

Thus, by knowing the draft force D for various soils and soil moistures, several of the model variables can be adjusted to fit local tillage conditions.

In certain instances, the implement controller 118 may include a look-up table, suitable mathematical formula, and/or algorithms stored within its memory 122 that correlates the sensor data 134 to the location and/or an operational parameter of the implement 10.

In particular embodiments, the operational parameter monitored or detected by the sensor(s) 114 may be indicative of a loading (such as draft loads) acting on one or more of the ground-engaging tools of the implement 10, such as the ground-engaging tools 42, 46, 48 described above with reference to FIG. 1. As used herein, draft loads generally refer to loads acting on the ground-engaging tools from the soil, such as reactive loads applied against the ground-engaging tools as they are pulled through, across and/or over the ground. In such embodiments, the sensor 114 may correspond to a contact sensor and/or a non-contact based sensor. Example contact sensors may include, for example, a potentiometric sensor, a load sensor, a torque sensor, or a strain gauge. Alternatively, example non-contact sensors may include, for example, a LIDAR sensor, a RADAR sensor, an ultrasonic sensor, an image capture device (e.g., an RGB, NIR-RGB, or CIR camera), and/or the like. However, it should be appreciated that, in alternative embodiments, the sensor 114 may correspond to any other suitable type of sensor and/or the sensor 114 may be configured to detect any other suitable operational parameter of the implement 10.

Still referring to FIG. 2, the implement controller 118 may be configured to anticipate a change in the loading of one or more of the ground-engaging tools of the implement, such as the ground-engaging tools 42, 46, 48, based on the location of the implement relative to an associated field map. In addition, the implement controller 118 is configured to transmit a request instructing the vehicle controller 124 to initiate a control action associated with adjusting at least one operational parameter of the work vehicle 12 to accommodate the anticipated change. Specifically, as shown in FIG. 2, the implement controller 118 may be communicatively coupled to the vehicle controller 124 via a wired or wireless connection to allow request signals (e.g., indicated by dashed lines 136 in FIG. 2) to be transmitted from the implement controller 118 to the vehicle controller 124. For example, in one embodiment, the request signals 136 may be transmitted from the implement controller 118 to the vehicle controller 124 via ISOBUS Class 3 (ISO 11783-9) communications protocols. However, in alternative embodiments, the request signals 134 may be transmitted via suitable CAN bus communications protocols or any other suitable communications protocols. Upon receipt of the request signals 136, the vehicle controller 124 may be configured to determine whether to control the operation of the work vehicle 12 in the manner requested by the implement controller 118.

Figure 3:
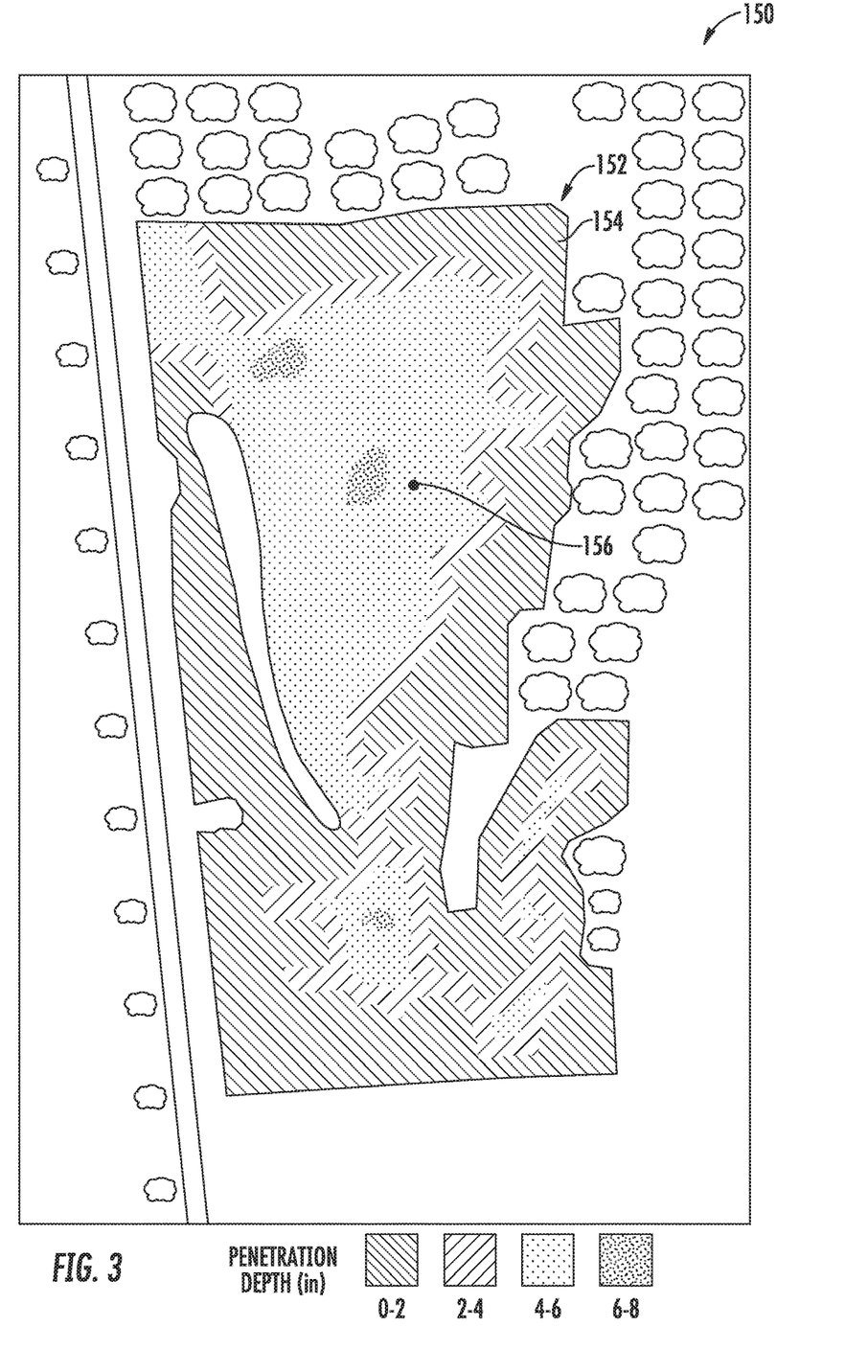
FIG. 3 illustrates a schematic view of one embodiment of a field map stored in a memory of a controller of a system for controlling the operation of a work vehicle towing an agricultural implement in accordance with aspects of the present subject matter.

In particular embodiments, the implement controller 118 may be configured to transmit the request instructing the vehicle controller 124 to initiate a control action when the implement controller 118 anticipates that one or more draft loads of the ground-engaging tools 42 will fall outside of a predetermined loads range. For example, as shown in FIGS. 2 and 3, the implement controller 118 may be programmed with a field map 150. The field maps 150 described herein may correspond, for example, to a prescription map 138 of the field and/or a compaction map 140 of the field. As described herein, prescription maps generally correspond to field maps that include target or desired penetration depths for one or more of the ground-engaging tools of the implement 10 for each location in the field, whereas compaction maps generally include soil compaction values for each location in the field.

Referring particularly to FIG. 3, the field map 150 corresponds to a prescription map 138 for illustrative purposes only. Thus, as shown, the map 150 includes an image of the field 152 with penetration depths 154 for the ground-engaging tools 42 for each location in the field 152. Thus, the implement controller 118 may be configured to determine an actual location 156 of the implement 10 based on the sensor data 134 from sensor(s) 114 and determine a corresponding penetration depth 154 at that location 156. By knowing the upcoming penetration depth, the implement controller 118 can anticipate changes in loading of the ground-engaging tools 42 of the implement 10. More specifically, the implement controller 118 may be configured to anticipate whether the draft load(s) will increase or decrease based on a prescribed change in one or more of the penetrations depths of the ground-engaging tools 42 as defined by the prescription map 138. In addition, where the field map(s) 150 corresponds to a compaction map 140, the implement controller 118 may be further configured to anticipate whether the draft loads will increase or decrease based on a change in one or more of the soil compaction values as defined by the compaction map 140. It should be understood that the vehicle controller 124, in addition or alternatively to the implement controller 118, may also be programmed with one or more of the field maps described herein.

In response to receiving the request instructing the vehicle controller 124 to initiate a control action, the vehicle controller 124 may be configured to implement the control action by modifying a parameter of the work vehicle 12. For example, in certain embodiments, the vehicle controller 124 may modify the engine speed of the vehicle's engine, the gear selection of the vehicle's transmission, and/or any other suitable operational parameter of the work vehicle 12. By modifying an operational parameter of the work vehicle 12, the loading of the ground-engaging tools of the implement 10 can be reduced or prevented from increasing e.g., by reducing the engine speed of the work vehicle 12 when the penetration depth is increasing or when high compaction layers are experienced within the field. Alternatively, the loading of the ground-engaging tools of the implement 10 can be increased e.g., by increasing the engine speed of the work vehicle 12 when the penetration depth is decreasing or when low compaction layers are experienced within the field. In such instances, the efficiency of tillage operation being performed can be improved by moving more quickly through the field.

For example, when the penetration depth of one or more of the tools of the implement 10 exceeds a predetermined maximum penetration depth threshold, the vehicle controller 124 may instruct the engine of the work vehicle 12 to decrease its power output (e.g., by decreasing the fuel flow to the engine) such that the speed at which the work vehicle 12 is moved across the field is decreased. Conversely, when the penetration depth of one or more of the tools falls below the predetermined minimum penetration depth threshold, the vehicle controller 124 may instruct the engine to increase its power output (e.g., by increasing the fuel flow to the engine) such that the speed at which the work vehicle 12 is moved across the field is increased.

Further, it should be understood that engine speed can be controlled while in the governed range of the engine. However, oftentimes, the work vehicle 12 is operated outside of the range (e.g. below the governed range). In such situations, the throttle position of the work vehicle 12 may be adjusted, which governs the quantity of fuel injected into the engine. As such, assuming a maximum ground speed of the implement 10 is met, then the throttle position and/or gear ratio selection can be controlled to optimize fuel efficiency (e.g. brake specific fuel consumption) to minimize the fuel usage required to complete the field operation.

Additionally, in one embodiment, the vehicle controller 124 may be configured to transmit a notification to the operator of the work vehicle 12 via the user interface 130 when the implement controller 118 is unable to provide the desired change to the operation of the work vehicle 12. It should be appreciated that the implement controller 118 may, instead, be configured to directly transmit a notification to the operator via the user interface 130 when the implement controller 118 is unable to provide the desired change to the operation of the work vehicle 12.

Figure 4:
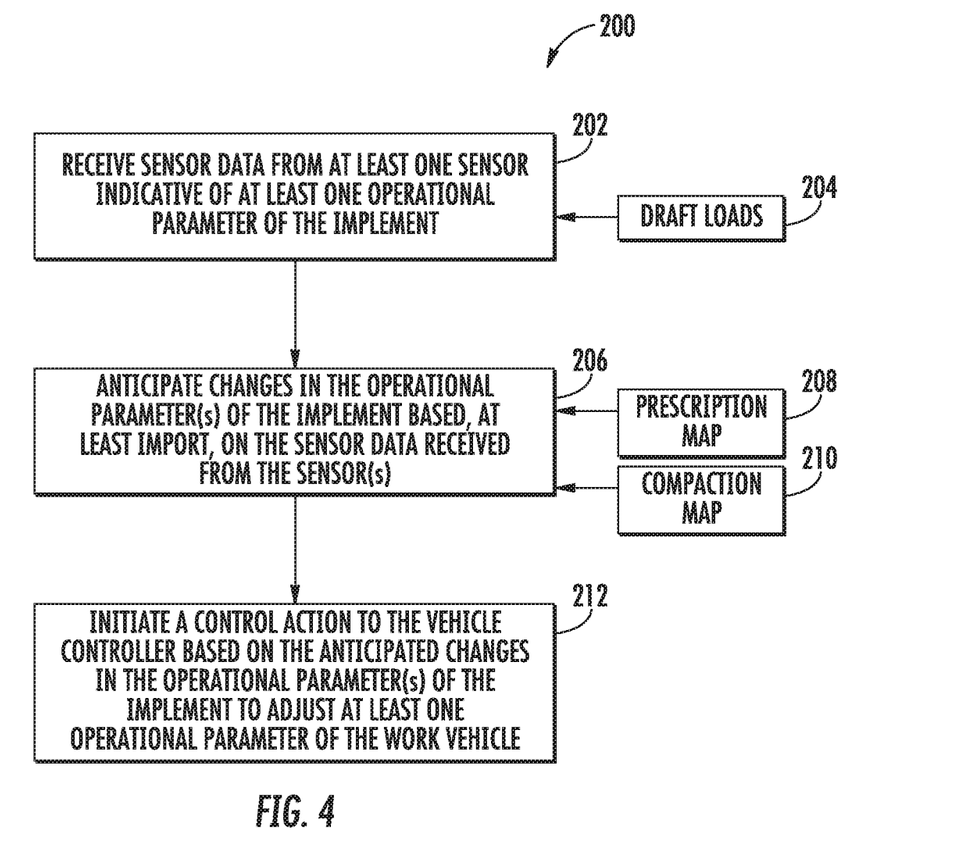
FIG. 4 illustrates a flow diagram of one embodiment of a method for controlling a work vehicle towing an agricultural implement in accordance with aspects of the present subject matter.

Referring now to FIG. 4, a flow diagram of one embodiment of a method 200 for controlling a work vehicle towing an agricultural implement having ground-engaging tools in a field is illustrated in accordance with aspects of the present subject matter. In general, the method 200 will be described herein with reference to the implement 10, the work vehicle 12 and the system 100 described above with reference to FIGS. 1 and 2. However, it should be appreciated by those of ordinary skill in the art that the disclosed method 200 may generally be utilized to control the operation of any other suitable work vehicle configurations towing any agricultural implement having any suitable implement configuration, and/or systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include storing at least one field map in a memory of at least one of the implement controller 118 or the vehicle controller 124. For example, as mentioned, the field map may include a prescription map and/or a compaction map. As shown at (204), the method 200 may also include receiving, via the implement controller 118, sensor data from at least one location sensor indicative of a location of the implement 10 within the field. For instance, as described above, the implement controller 118 may be communicatively coupled to the sensor(s) 114 configured to monitor the location of the implement 10. As such, sensor data 134 transmitted from the sensor 114 may be received by the implement controller 118 for monitoring the implement location.

Additionally, at (206), the method 200 may include anticipating, via the implement controller 118, a change in loading of one or more of the ground-engaging tools of the implement 10 based on the location of the implement 10 relative to the field map. More specifically, as shown, the implement controller 118 may be configured to anticipate changes in loading of the implement 10 by coordinating the actual location of the implement 10 as determined by the sensor(s) 114 with a corresponding location on the prescription map 208 and/or the compaction map 210. Thus, the corresponding location on the prescription map 208 and/or the compaction map 210 has a corresponding penetration depth and/or compaction level. In such embodiments, the implement controller 118 may be configured to anticipate or predict whether the loads acting on the implement 10 will increase or decrease based on a prescribed change in one or more of the penetrations depths of the ground-engaging tools 42 as defined by the prescription map 138. In addition, or alternatively, the implement controller 118 may be configured to predict whether the loads acting on the implement 10 will increase or decrease based on a change in one or more of the soil compaction values as defined by the compaction map 140.

Moreover, as shown in FIG. 4 at (212), the method 200 may include transmitting a request instructing the vehicle controller 124 to initiate a control action associated with adjusting at least one operational parameter of the work vehicle 12 to accommodate the anticipated change. For example, as mentioned, if the implement controller 118 anticipates that the draft loads acting on the ground-engaging tools 42 of the implement 10 will increase or decrease by a certain amount, the implement controller 118 may request the vehicle controller 124 to modify operation of the engine and/or transmission thereof, as necessary, to maintain efficiency of the work vehicle 12 as a desired level and/or to prevent undesirable performance of the implement 10.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for controlling work vehicles used for towing agricultural implements through a field; the method comprising:

controlling, with one or more processor-based computing devices supported on an agricultural implement, an operation of the agricultural implement such that a plurality of ground-penetrating tools of the agricultural implement penetrate into soil within a field to perform an agricultural operation;

receiving, with the one or more processor-based computing devices, sensor data from at least one location sensor that is indicative of a location of the agricultural implement within the field;

accessing, with the one or more processor-based computing devices, a prescription map for the field that prescribes target penetration depths for one or more of the plurality of ground-penetrating tools at a plurality of different locations across the field;

anticipating, with the one or more processor-based computing devices, a change in loading indicative of forces exerted on one or more of the plurality of ground-penetrating tools of the agricultural implement by the soil within the field as the one or more of the plurality of ground-penetrating tools are pulled through the soil based on the location of the implement relative to the prescription map; and transmitting, with the one or more processor-based computing devices, a request instructing that a vehicle controller supported on a work vehicle towing the agricultural implement to initiate a control action associated with adjusting at least one vehicle-related operational parameter to accommodate the anticipated change in loading of the one or more of the plurality of ground-penetrating tools of the agricultural implement.

2. The method of claim 1, further comprising receiving, with the one or more processor-based computing devices, sensor data from at least one load sensor indicative of a load exerted on the agricultural implement by the soil within the field.

3. The method of claim 1, wherein anticipating the change in loading of the one or more of the plurality of ground-penetrating tools of the agricultural implement comprises anticipating whether the change in loading will increase or decrease based on upcoming change in the penetrations depth of the one or more of the plurality of ground-penetrating tools of the agricultural implement as defined by the prescription map.

4. The method of claim 1, wherein the at least one vehicle-related operational parameter comprises at least one of an engine speed, a throttle position, or a gear selection of the work vehicle.

5. The method of claim 4, further comprising modifying, with the vehicle controller, at least one of the engine speed, the throttle position, or the gear selection in response to receiving the request to initiate the control action.

6. The method of claim 5, wherein modifying the at least one of the engine speed, the throttle position, or the gear selection of the work vehicle further comprises decreasing the engine speed when the anticipated change in loading of the one or more of the plurality of ground-penetrating tools exceeds a desired loading threshold.

7. The method of claim 5, wherein modifying the at least one of the engine speed, the throttle position, or the gear selection of the work vehicle further comprises at least one of increasing the engine speed when the anticipated change in loading of the one or more of the plurality of ground-penetrating tools is below the desired loading threshold, changing gears of an engine of the work vehicle to a higher gear when the anticipated change in loading of the one or more of the plurality of ground-penetrating tools is below the desired loading threshold, or changing the throttle position of the engine of the work vehicle when the anticipated change in loading of the one or more of the plurality of ground-penetrating tools is below the desired loading threshold.

8. The method of claim 5, wherein modifying at least one of the engine speed, the throttle position, or the gear selection of the work vehicle further comprises changing gears of an engine of the work vehicle to a lower gear when the anticipated change in loading of the one or more of the plurality of ground-penetrating tools exceeds the desired loading threshold.

9. The method of claim 1, wherein the anticipated change in loading is associated with an anticipated change in draft loading for the agricultural implement based on the upcoming change in the penetration depth as defined by the prescription map.

10. A system for controlling work vehicles used for towing agricultural implements through a field, the system comprising:

an agricultural implement comprising a frame and a plurality of ground-penetrating tools supported by the frame, the plurality of ground-penetrating tools being configured to penetrate into soil within the field;

an implement controller supported on the agricultural implement and being configured to control an operation of the agricultural implement, the implement controller being configured to access a prescription map for the field that prescribes target penetration depths for one or more of the plurality of ground-penetrating tools at a plurality of different locations across the field; and at least one sensor communicatively coupled to the implement controller, the at least one sensor configured to provide an indication of a location of the agricultural implement within the field, wherein the implement controller is configured to:

anticipate a change in loading of the one or more of the plurality of ground-penetrating tools of the agricultural implement based on the location of the agricultural implement relative to the prescription map; and transmit a request instructing that a vehicle controller supported on a work vehicle towing the agricultural implement initiate a control action associated with adjusting at least one vehicle-related operational parameter to accommodate the anticipated change in loading of the one or more of the plurality of ground-penetrating Jools of the agricultural implement.

11. The system of claim 10, wherein the implement controller is configured to anticipate the change in loading of the one or more of the plurality of ground-penetrating tools of the agricultural implement by anticipating whether the change in loading will increase or decrease based on an upcoming change in the penetration depth of the one or more of the plurality of ground-penetrating tools of the agricultural implement as defined by the prescription map.

12. The system of claim 10, wherein the anticipated change in loading is associated with an anticipated change in draft loading for the agricultural implement based on the upcoming change in the penetration depth as defined by the prescription map.

13. The system of claim 10, wherein the at least one vehicle-related operational parameter comprises at least one of an engine speed, a throttle position, or a gear selection of the work vehicle.

14. The system of claim 13, wherein, in response to receiving the request from the implement controller, the vehicle controller is configured to execute the control action by modifying at least one of the engine speed, the throttle position, or the gear selection.

15. The system of claim 14, wherein, when modifying the at least one of the engine speed, the throttle position, or the gear selection of the work vehicle, the vehicle controller is further configured to decrease the engine speed when the anticipated change in loading of the one or more of the plurality of ground-penetrating tools exceeds a desired loading threshold.

16. The system of claim 14, wherein, when modifying the at least one of the engine speed, the throttle position, or the gear selection of the work vehicle, the vehicle controller is further configured to at least one of increase the engine speed when the anticipated change in loading of the one or more of the plurality of ground-penetrating tools is below the desired loading threshold, change gears of an engine of the work vehicle to a higher gear when the anticipated change in loading of the one or more of the plurality of ground-penetrating tools is below the desired loading threshold, or change the throttle position of the engine of the work vehicle when the anticipated change in loading of the one or more of the plurality of ground-penetrating tools is below the desired loading threshold.

17. The system of claim 14, wherein, when modifying at least one of the engine speed, the throttle position, or the gear selection of the work vehicle, the vehicle controller is further configured to change gears of an engine of the work vehicle to a lower gear when the anticipated change in loading of the one or more of the plurality of ground-penetrating tools exceeds the desired loading threshold.

* * * * *